INVENTOR
PETER B. OLMSTED

BY *Olsen and Stephenson*
ATTORNEYS

United States Patent Office 3,435,851
Patented Apr. 1, 1969

3,435,851
VALVE
Peter B. Olmsted, 1823 Arlington Road,
Ann Arbor, Mich. 48104
Filed Sept. 6, 1966, Ser. No. 577,427
Int. Cl. F15d 1/02
U.S. Cl. 137—625.48          3 Claims

ABSTRACT OF THE DISCLOSURE

A spool valve having ports and a group of vanes associated with each port, the vanes being arranged so that they emanate from an annulus around the spool and function to direct fluid from a plurality of sides of the spool to reduce the imbalance of fluid forces on the spool and improve valve flow characteristics.

---

This invention relates generally to valves and more particularly to an improved spool valve utilizing vanes for directing fluid generally radially of the spool.

Conventional spool valves utilize a hollow multi-port body or housing having an axially shiftable spool mounted therein for directing fluid between different ones of the ports in different shifted positions of the spool. When the fluid flows through the housing, and around the spool, during travel between a pair of inlet and outlet ports, the fluid generally takes the shortest path, which is a more or less diagonal path extending between connected inlet and outlet ports. Diagonal flow of the fluid is at an increased velocity, causing a significant pressure drop between the ports since the pressure drop is proportional to the square of the fluid velocity. Such a pressure drop is objectionable because it adversely affects the capacity of the valve. In addition, this diagonal flow of fluid creates an unbalanced force on the spool tending to urge a portion of the spool exposed to the fluid flow sideways in one direction against the valve body. This sideways force on the spool in turn results in frictional forces which tend to impede the free shifting movement of the valve, and when the spool is subjected to several of these sideways directed forces spaced axially along the spool, the spool is subjected to some undesirable deflection. It is therefore desirable in valves of this type to reduce this pressure drop and eliminate the unbalanced condition of the forces to which the spool is subjected. It is an object of this invention, therefore, to provide an improved spool valve which includes vanes for directing fluid generally radially of the spool at both the inlet and outlet ports for the valve. This vane arrangement necessitates a flow of fluid from the inlet port uniformly radially around the spool, so that there are no unbalanced forces applied to this spool, thence axially of the spool, and finally radially again of the spool through the outlet port.

In the improved spool valve of this invention, a group of vanes, preferably at least three in number, are arranged at each port so that they emanate from an annulus around the spool and act to direct the fluid either radially inwardly toward the spool or radially outwardly away from the spool, depending on whether the port is an inlet port or an outlet port, and so that the fluid will flow parallel to the spool axis during travel along the spool. Furthermore, in the valve of this invention, a group of vanes at each port are arranged so that when the pressure is applied at the port, the expansion of the valve is in an axial direction, rather than a radial direction which would cause warping of the valve body, due to an arrangement of the vanes so that the majority of the vane mass is on the port side of the spool.

A further object of this invention, therefore, is to provide an improved spool valve utilizing fluid directing vanes arranged in groups of at least three so that the vanes effectively counteract some of the practical problems which were heretofore inherent in valves of this type.

Further objects, features and advantages of this invention will become apparent from a consideration of the following description, the appended claims, and the accompanying drawing in which:

Figure 1:
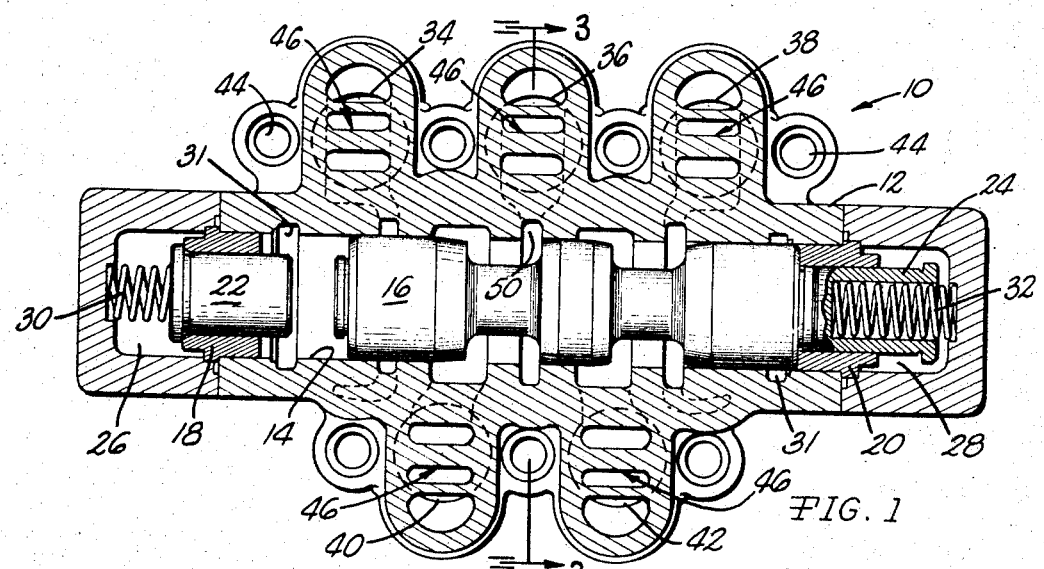
FIGURE 1 is a longitudinal sectional view of the improved valve of this invention showing the valve spool in one position in the valve body.

With reference to the drawing, the improved valve of this invention, indicated generally at 10, is illustrated in FIG. 1, as including a hollow body 12 formed with an internal passage 14 in which a spool 16 is slidably mounted. The ends of the spool passage 14 terminate in sleeves 18 and 20 in which hollow pistons 22 and 24, respectively, are slidably mounted. The sleeves 18 and 20 are assembled in fluid-tight relation with the body 12 and cooperate therewith to form pilot chambers 26 and 28, respectively, which communicate in a conventional manner with a pair of pilot lines (not shown). Springs 30 and 32 urge the pistons 22 and 24, respectively, toward the spool 14 so that the pistons 22 and 24 will resiliently cushion spool movement as the spool approaches the positions shown in FIGS. 1 and 2. Chambers 31 formed in the passage 14 between the spool ends and the pistons 22 and 24 also communicate with conventional pilot lines (not shown).

Figure 2:
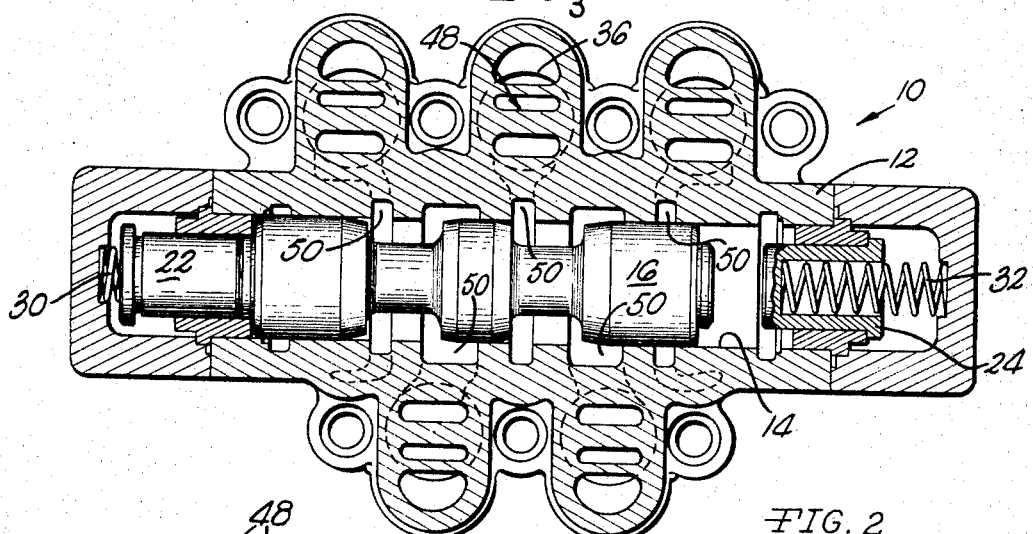
FIGURE 2 is a longitudinal sectional view of the valve of this invention, similar to FIG. 2, showing the spool in another position in the valve body.

The valve body 12 is provided with a plurality of ports, five in number in the illustrated embodiment of the invention, indicated at 34, 36, 38, 40 and 42. The spool 16 is conventionally formed so that when it is shifted to the right, as shown in FIG. 1, certain of these ports are communicated through the valve passage 14, and when the spool 16 is shifted to the left, as shown in FIG. 2, others of the ports are communicated through the passage 14. Bolt holes 44 in the body 12 enable the body to be bolted to a conventional base.

Figure 3:
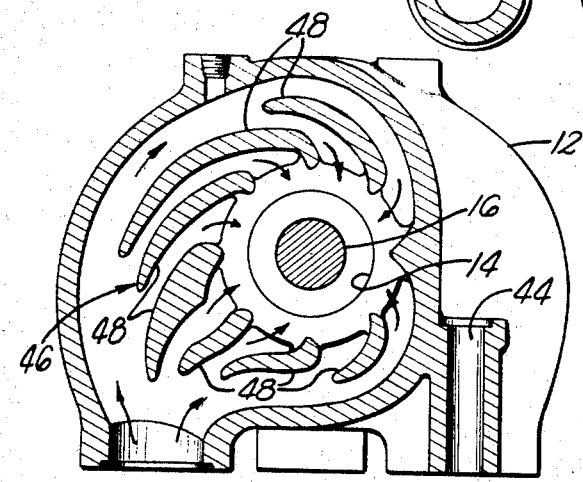
FIGURE 3 is a transverse sectional view of the improved valve of this invention as seen from substantially the line 3—3 in FIG. 1.

As shown in FIGS. 1 and 2, each of the valve ports 34–42 communicates with an annulus extending about the spool 16, all of the annuli being indicated by the numeral 50 for purposes of clarity. A group 46 of fluid directing vanes 48 is associated with each of the ports 34–42, the groups 46 being identical so that only the group of vanes 48 associated with the port 36 will be hereinafter described in detail. As shown in FIG. 3, all of the vanes 48 in the group 46 emanate from the annulus 50 for port 36 and are curved so that they cooperate with each other and with the body 12 to direct fluid flowing from the port 36 toward the spool 16 so that the fluid flows smoothly along the arrowed lines indicated in FIG. 3. This fluid thus flows from the port 36 radially toward the spool 16, thence axially around the spool 16 toward either the port 40 or the port 42, depending on whether the spool 16 is in the FIG. 1 or the FIG. 2 position. Thus, the vanes 48 in the group 46 associated with the port 36 cooperate with the vanes at the ports 40 or 42 to prevent the fluid from flowing diagonally across spool 16 so as to create unbalanced forces on the spool 16 tending to urge it against one side of the passage 14. The result is of course the same if the flow of fluid is reversed so that it flows to instead of from port 36. As a result, the forces on the spool 16 are balanced in directions radially of the spool 16 so as not to impede free shifting of the spool 16 in between its FIG. 1 and FIG. 2 positions.

In a preferred embodiment of the invention at least three vanes 48 are incorporated in each group 46 so as to insure a full control of the flow of fluid toward and away from spool 16. As shown in FIG. 3, the port 36 is spaced to the left of the axis of the spool 16. A major portion of the mass of the vanes 46 is also located to the left of the spool axis 16 to thereby insure against pressure from the port 36 warping the body 12 in a direction transversely of the spool 16. Thus, when fluid pressure is applied to the body 12, expansion of the body is in a direction axially of the spool 16 rather than radially which is desirable to prevent warping of body 12. Furthermore, by virtue of the inclusion of the vane groups 46 at each of the valve ports, the pressure drop across the valve is significantly reduced because the velocity of the fluid flowing across the spool 16 is significantly reduced in each case.

From the above description it is seen that this invention provides an improved spool valve 10 utilizing vane groups 46 associated with each of the valve ports to thereby eliminate pressure imbalance on the spool 16, pressure drops across the valve, objectionable warping of the valve body, and insure a continually smooth flow of fluid through the valve.

What is claimed is:

1. In a valve having a hollow body provided with at least a pair of ports through which fluid can flow, an axially movable spool in said body, said ports being arranged so that the axes thereof are transverse to the axis of said spool, a plurality of vanes in said body arranged in groups so that each group is associated with one of said ports, the vanes in each of said groups being spaced apart and arranged so that they emanate from an annulus around said spool with at least two of said vanes being on transversely opposite sides of said spool, said vanes being configured so that they cooperate with each other and with said body to direct fluid in said body in a direction transversely of said spool on a plurality of sides thereof when said fluid is flowing to or from the port with which said vanes are associated.

2. In a valve having the structure set forth in claim 1 wherein each group of vanes includes at least three vanes.

3. In a valve having the structure set forth in claim 2 wherein each port is spaced transversely to one side of the axis of said spool, and wherein the vanes in each group are arranged so that the majority of the total mass of said vanes is disposed on said one side of said spool axis.

References Cited

UNITED STATES PATENTS

| | | | |
|---|---|---|---|
| 3,139,908 | 7/1964 | Strader | 137—625.48 |
| 3,171,353 | 3/1965 | McMahan | 230—130 X |

M. CARY NELSON, *Primary Examiner.*

MICHAEL O. STURM, *Assistant Examiner.*

U.S. Cl. X.R.

138—39